United States Patent
Gould (10) Patent No.: US 11,414,043 B2
(45) Date of Patent: Aug. 16, 2022

(54) AIRBAG WITH SINGLE PANEL VENT FLAP

(71) Applicant: ZF Passive Safety Systems US Inc., Washington, MI (US)

(72) Inventor: Douglas Gould, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/118,639

(22) Filed: Dec. 11, 2020

(65) Prior Publication Data

US 2022/0185220 A1 Jun. 16, 2022

(51) Int. Cl.
*B60R 21/239* (2006.01)
*B60R 21/2338* (2011.01)
*B60R 21/205* (2011.01)

(52) U.S. Cl.
CPC .......... *B60R 21/239* (2013.01); *B60R 21/205* (2013.01); *B60R 21/2338* (2013.01); *B60R 2021/2395* (2013.01); *B60R 2021/23386* (2013.01)

(58) Field of Classification Search
CPC . B60R 21/239; B60R 21/205; B60R 21/2338; B60R 2021/23386; B60R 2021/2395
See application file for complete search history.

(56) References Cited

U.S. PATENT DOCUMENTS

| | | |
|---|---|---|
| 6,773,030 B2 | 8/2004 | Fischer |
| 6,959,945 B2 | 11/2005 | Fischer et al. |
| 7,083,191 B2 | 8/2006 | Fischer |
| 7,607,689 B2 | 10/2009 | Kalczynski et al. |
| 8,684,404 B2 | 4/2014 | Fischer et al. |
| 8,696,022 B2 | 4/2014 | Fischer et al. |
| 8,764,058 B2 | 7/2014 | Fischer et al. |
| 9,327,674 B2 | 5/2016 | Fischer et al. |
| 10,647,287 B2 * | 5/2020 | Komatsu ............. B60R 21/2338 |

(Continued)

FOREIGN PATENT DOCUMENTS

| | | | | |
|---|---|---|---|---|
| DE | 102013113434 A1 * | 6/2015 | ........... | B60R 21/239 |
| WO | WO-2014090951 A * | 6/2014 | ........... | B60R 21/239 |

*Primary Examiner* — Drew J Brown
(74) *Attorney, Agent, or Firm* — Tarolli, Sundheim, Covell & Tummino LLP (57) ABSTRACT

An apparatus for helping to protect an occupant of a vehicle includes an airbag comprising a vent having a closed condition blocking inflation fluid flow through the vent, and an opened condition permitting inflation fluid to flow through the vent. The vent includes a vent opening formed in a panel of the airbag and a vent flap connected to the airbag panel adjacent to the vent opening. The vent flap is configured to block inflation fluid flow through the vent opening in the closed condition of the vent, and to permit inflation fluid flow through the vent opening in the opened condition of the vent. The vent flap includes a plurality of folds configured to form one or more pleats in the vent flap. The vent flap is held extending across and covering the vent opening in the closed condition of the vent. The vent flap is released and uncovers the vent opening in the open condition of the vent. In response to the vent flap being released in the open condition of the vent, the pleats are configured to unfold under the pressure of inflation fluid in the airbag to uncover the vent opening and permit inflation fluid to vent through the vent opening.

20 Claims, 6 Drawing Sheets

(56) References Cited

U.S. PATENT DOCUMENTS

| | | | |
|---|---|---|---|
| 2010/0001498 A1* | 1/2010 | Abe | B60R 21/2338 |
| | | | 280/739 |
| 2011/0031723 A1* | 2/2011 | Fischer | B60R 21/235 |
| | | | 280/730.1 |
| 2013/0334801 A1* | 12/2013 | Williams | B60R 21/239 |
| | | | 280/739 |
| 2017/0008479 A1* | 1/2017 | Aranzulla | B60R 21/237 |
| 2020/0148151 A1* | 5/2020 | Yamauchi | B60R 21/239 |

* cited by examiner

AIRBAG WITH SINGLE PANEL VENT FLAP

TECHNICAL FIELD

This disclosure relates to an apparatus for helping to protect an occupant of a vehicle. More particularly, this disclosure relates to a vent for an airbag that is inflatable between a vehicle surface and a vehicle occupant.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags can be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated position. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Inflatable vehicle occupant protection devices also include airbags for providing side protection, such as side airbags mounted in a seat or side door, and curtain airbags mounted in or along the vehicle roof. Inflatable knee bolster airbags can inflate in a footwell of the vehicle to help protect the occupant's knees and lower legs. Rear airbags, both front and side, can help protect rear seat passengers For any airbag, it may be desirable to provide a vent for releasing or venting inflation fluid from the inflatable volume of the airbag. This can be done, for example, to help control the ride-down effect afforded by the airbag or to account for sensed conditions of the vehicle and/or the occupant at the time of deployment. For instance, it may be desirable to vent inflation fluid from an airbag when sensed vehicle and/or conditions indicate that the occupant is positioned close to the airbag. This can be the case, for example, where the driver is a small occupant, such as a 5% female occupant, with the seat positioned at a full-forward position, which places the driver close to the airbag at the time of deployment.

SUMMARY

A vent for an airbag includes a vent opening in the airbag fabric and a flap for controlling the opening and closing of the vent. The flap is constructed of a single piece of fabric that is folded to form pleats that extend across the vent opening. The flap is configured so that tension on the flap in a direction generally parallel to the pleats tensions the flap and maintains the vent in the closed condition. The flap is also configured so that, when tension on the flap is released, inflation fluid pressure inside the airbag pushes on the flap, which causes the pleats to unfold, which permits inflation fluid to flow through the vent opening and exit the airbag.

According to one aspect, an apparatus for helping to protect an occupant of a vehicle includes an airbag comprising a vent having a closed condition blocking inflation fluid flow through the vent, and an opened condition permitting inflation fluid to flow through the vent. The vent includes a vent opening formed in a panel of the airbag and a vent flap connected to the airbag panel adjacent to the vent opening. The vent flap is configured to block inflation fluid flow through the vent opening in the closed condition of the vent, and to permit inflation fluid flow through the vent opening in the opened condition of the vent. The vent flap includes a plurality of folds configured to form one or more pleats in the vent flap. The vent flap is held extending across and covering the vent opening in the closed condition of the vent. The vent flap is released and uncovers the vent opening in the open condition of the vent. In response to the vent flap being released in the open condition of the vent, the pleats are configured to unfold under the pressure of inflation fluid in the airbag to uncover the vent opening and permit inflation fluid to vent through the vent opening.

According to a second aspect, the vent flap can be configured to be tensioned in the closed condition of the vent.

According to third aspect, alone or in combination with any of the preceding aspects, the vent can further include a vent outlet defined by the vent opening and the vent flap. The vent outlet is blocked in the closed condition of the vent, and unblocked in the opened condition of the vent. The pleats in the vent flap are configured to unfold when the vent is in the opened condition of the vent to enlarge the size of the vent outlet in the open condition of the vent.

According to a fourth aspect, alone or in combination with any of the preceding aspects, the vent flap can include a flap portion and a tether portion. The tether portion can be configured to apply tension to the flap portion. The flap portion can include the pleats and can be configured to block inflation fluid flow through the vent opening in the closed condition of the vent, and to permit inflation fluid flow through the vent opening in the opened condition of the vent. According to this aspect According to a fifth aspect, in combination with the fourth aspect, the vent can also include a support panel connected to the airbag and configured to support the vent flap. The support panel can form a pocket between the support panel and the airbag. The pocket can receive the flap portion and maintain the flap portion positioned to block inflation fluid flow through the vent opening in the closed condition of the vent.

According to a sixth aspect, in combination with the fourth and fifth aspects, the vent can also include a first connection that connects an upper edge portion and opposite end portions of the flap portion to the airbag. A lower portion of the flap portion can be received in the pocket.

According to a seventh aspect, in combination with the fourth, fifth, and sixth aspects, the first connection can include stitching that extends along a periphery of the flap portion from a first end portion of the flap portion, along the upper edge portion of the flap portion, to a second end portion of the flap portion.

According to a eighth aspect, in combination with the fourth, fifth, and sixth aspects, the pleats can extend through the upper edge portion of the flap portion. The first connection can maintain the pleated configuration of the flap portion in the area of the first connection.

According to a ninth aspect, in combination with the fourth, fifth, and sixth aspects, the first connection extends along a periphery of the vent opening from a first end of the vent opening, along an upper edge of the vent opening, to a second end, opposite the first end, of the vent opening, and wherein, in the opened condition of the vent, a vent outlet is defined by a lower peripheral edge of the airbag adjacent the vent opening and a lower edge portion of the flap portion.

According to a tenth aspect, in combination with the fourth and fifth aspects, the vent opening can have a predetermined shape, and the flap portion can be configured to approximate the predetermined shape when the pleats are folded. The flap portion can be further configured to be sized larger than the vent opening so as to overlap with airbag material along an entire periphery of the vent opening when the vent is in the closed condition.

According to an eleventh aspect, in combination with the tenth aspect, a first connection can connect the flap portion to the airbag along an upper periphery of the vent opening.

According to a twelfth aspect, in combination with the fourth and fifth aspects, the vent flap and the support panel can be secured to an exterior of the airbag with a lower portion of the flap portion and the tether portion being positioned between the airbag and the support portion.

According to a thirteenth aspect, in combination with the fourth aspect, the vent flap consists of a single piece of fabric material that is cut out or otherwise constructed to include the flap portion and the tether portion.

According to a fourteenth aspect, in combination with any of the preceding aspects an actuator can be connected with the vent flap. The actuator anchors the vent flap so that the vent is maintained in the closed condition. The actuator is actuatable to release the vent flap to place the vent in the opened condition.

According to a fifteenth aspect, in combination with the fourteenth aspect, the airbag, vent flap, and actuator can be configured so that the vent flap is tensioned in response to deployment of the airbag while the actuator anchors the vent flap.

According to a sixteenth aspect, in combination with the fourteenth and fifteenth aspects, a support panel can be connected to the airbag and configured to support the vent flap. The support panel can form a pocket for receiving the flap portion. The airbag, vent flap, and actuator can be configured so that the flap portion is tensioned into the pocket in the closed condition of the vent.

According to a seventeenth aspect, an airbag module can include the apparatus according to any of the preceding aspects. The airbag module can also include an inflator for inflating the airbag and a housing for supporting the inflator and the airbag in a deflated and stored condition.

According to an eighteenth aspect, a vehicle safety system can include the airbag module according to the seventeenth aspect. The vehicle safety system can also include an actuator for maintaining the vent in the closed condition. The actuator can be actuatable to place the vent in the opened condition. The vehicle safety system can also include at least one crash sensor and at least one vehicle and/or occupant condition sensor. The vehicle safety system can further include a controller configured to control the actuation of the inflator in response to the at least one crash sensor, and to control the actuator in response to the at least one vehicle and/or occupant condition sensor.

DRAWINGS

The foregoing and other features of the present invention will become apparent to one skilled in the art to which the subject disclosure relates upon consideration of the following description with reference to the accompanying drawings, in which.

DESCRIPTION

Figure 1:
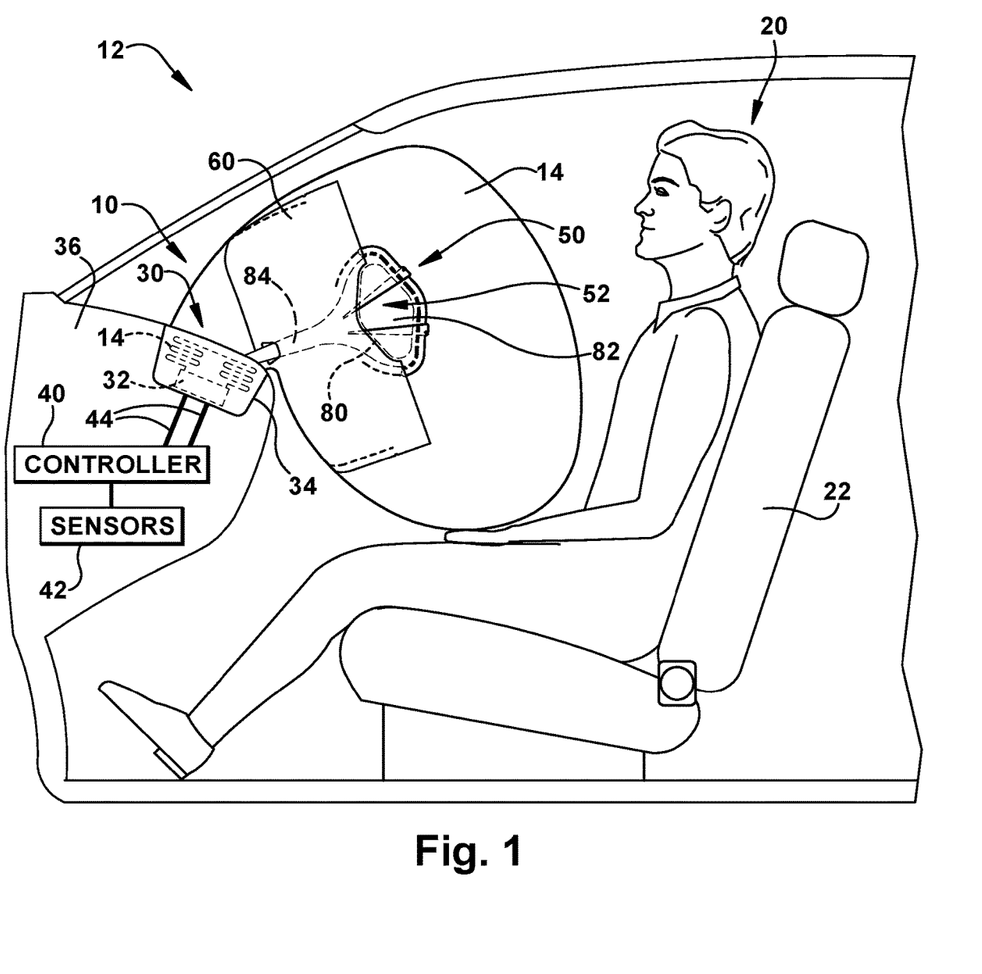
FIG. 1 is a schematic side view illustrating an apparatus for helping to protect an occupant of a vehicle, the apparatus including an airbag and a vent for venting inflation fluid from the airbag, according to one example configuration.

FIG. 1 illustrates an example configuration of a vehicle safety system and apparatus 10 for helping to protect an occupant 20 of a vehicle 12. The system and apparatus 10 includes an inflatable vehicle occupant protection device 14, in the form of an airbag, that includes a vent 50 for venting inflation fluid from the airbag. In the example configuration of FIG. 1, the airbag 14 is a passenger frontal airbag for helping to protect the occupant 20 of a front vehicle seat 22 on a passenger side 24 of the vehicle 12. Alternatively, the apparatus 10 can be configured for a passenger side of the vehicle 12 to help protect a passenger side vehicle occupant. The apparatus 10 is not limited to a frontal airbag configuration. The vent configurations described herein can be applied to any inflatable vehicle occupant protection device where inflation fluid venting is desired, such as side airbags, curtain airbags, rear airbags, and knee bolster airbags.

The airbag 14 can be part of an airbag module 30 that includes an inflator 32 and a support or housing 34 for the airbag and inflator. The airbag 14 has a stored condition, indicated by dashed lines in FIG. 1, in which the airbag is folded and placed in the housing 34. The module 30 is mounted facing towards the occupant 20 in a dash or instrument panel 36 of the vehicle 12. The housing 34 helps contain and support the airbag 14 and inflator 32 in the instrument panel 36. Alternatively, in a driver configuration, the module 30 could be mounted to a steering wheel (not shown) of the vehicle 12.

The inflator 32 is actuatable to provide inflation fluid to an inflatable volume of the airbag 14 to deploy the airbag to the inflated condition. The inflator 32 can be of any known type, such as stored gas, solid propellant, augmented or hybrid. The apparatus 10 also includes a controller, illustrated schematically at 40, for providing an actuation signal to the apparatus 10 in response to a crash event. The sensors 42 can include crash sensors, such as accelerometers for sensing vehicle crash conditions. The sensors 42 can also include condition sensors for sensing vehicle and/or occupant conditions, such as seat weight sensors, seat position sensors, seatbelt buckle latch sensors, and occupant presence sensors. The inflator 32 is operatively connected to the controller 40 via lead wires 44.

The controller 40 can provide the actuation signal to the inflator 32 in response to crash sensors 42 detecting the occurrence of a vehicle crash. At the same time, the controller 40 can control whether the vent 50 is in the closed condition or opened condition in response to vehicle and/or occupant conditions determined via the condition sensors 42. For example, if the condition sensors 42 determine a condition, such as a full-forward seat position, an unbuckled occupant, or the presence of a small occupant positioned close to the instrument panel 36 and/or airbag 14, the controller 40 can cause the vent to be placed in the opened condition when the airbag is deployed.

The airbag 14 can be constructed of any suitable material, such as nylon, e.g., woven nylon 6-6 yarns, and can be constructed in any suitable manner. For example, the airbag 14 can include one or more pieces or panels of material. If more than one piece or panel is used, the pieces or panels can be interconnected by known means, such as stitching, ultrasonic welding, heat bonding, or adhesives, to form the airbag. The airbag 14 can be uncoated, coated with a material, such as a gas impermeable urethane, or laminated with a material, such as a gas impermeable film. The airbag 14 thus can have a gas-tight or substantially gas-tight construction. Those skilled in the art will appreciate that alternative materials, such as polyester yarn, and alternatives coatings, such as silicone, can also be used to construct the airbag 14.

Upon sensing the occurrence of an event for which inflation of the airbag 14 is desired, such as a vehicle collision, the sensors 42 provide a signal to the controller 40, which actuates the inflator 32 via the lead wires 44. Upon receiving the signal from the controller 40, the inflator 32 is actuated and provides inflation fluid to the inflatable volume of the airbag 14 in a known manner. The airbag 14 inflates towards the occupant 20 from the stored condition to an inflated and deployed condition illustrated in FIG. 1. The airbag 14, while inflated, helps protect the vehicle occupant 20 from impacts with parts of the vehicle 12, such as the instrument panel 36, cushions the occupant, and helps provide a desired ride-down effect.

The vent 50 is actuatable to release inflation fluid from the inflatable volume of the airbag 14. The vent 50 includes a tether 80 for controlling an open/closed condition of the vent 50. For example, the tether 80 can be secured to an anchor that is actuatable to release the tether. In a locked condition of the anchor, the tether 80 can be maintained in the anchored condition and maintain the vent 50 in the closed condition blocking inflation fluid from venting from the airbag 14. In an unlocked condition of the anchor, the tether 80 can be released from the anchored condition, allowing the vent to open and vent inflation fluid from the airbag.

Figure 2:
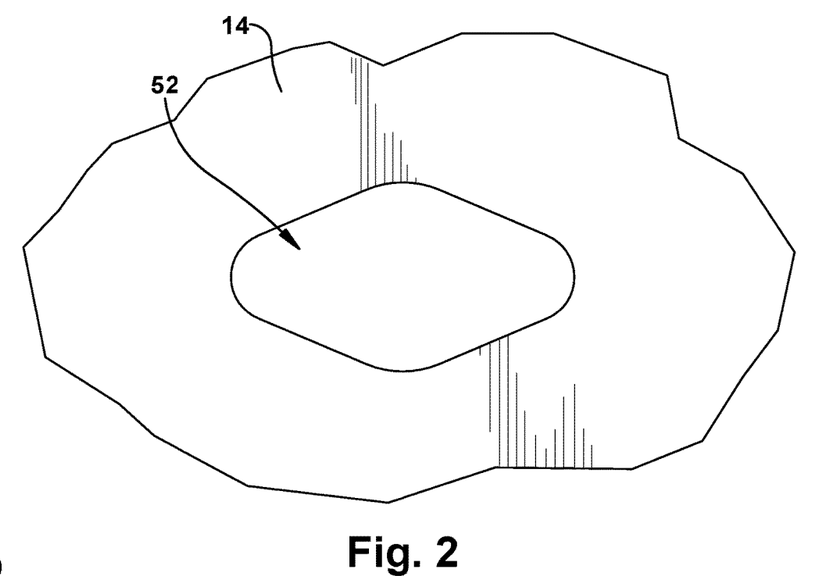
FIG. 2 is a magnified plan view of a portion of the airbag.

Referring to FIG. 2, the airbag 14 includes a vent opening 52 that extends through the airbag fabric and provides fluid communication between the inflatable volume of the airbag, i.e., the interior of the airbag, and the atmosphere exterior to the airbag. In the example configuration illustrated in the figures, the vent opening 52 has a generally diamond-shaped configuration. The shape of the vent opening 52, however, is not important and can have any desired shape.

Figure 3:
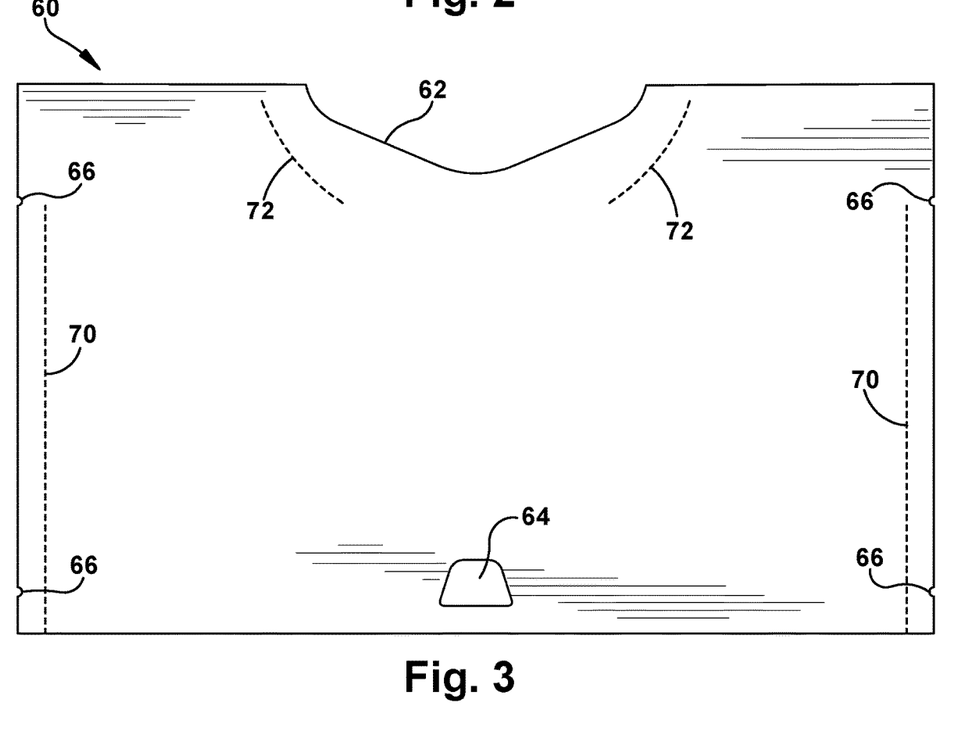
FIG. 3 is a plan view of a vent support panel portion of the vent.

FIG. 3 illustrates a support panel 60 component of the airbag vent 50. The support panel 60 is generally rectangular, but could have other shapes that don't materially affect the operation of the vent 50. The support panel 60 includes a cutout portion 62, positioned along an upper edge of the panel, that can be configured to match or approximate the shape of a lower portion of the vent opening 52 (see, FIG. 2). Thus, while the shape of the vent opening 52 is not important, configuring the cutout portion 62 to match or approximate the shape of the lower portion of the vent opening can be important, as discussed herein. The support panel 60 also includes a tether opening 64 along a lower edge of the panel.

The support panel 60 can also include features for assisting in assembly of the airbag vent 50. For example, the support panel 60 can include alignment notches 66 for assisting in the alignment of the panel during assembly of the vent 50. The support panel 60 can also include indicia to indicate the location of stitch lines used to assemble the vent 50. For example, the support panel can include stitch lines 70 along lateral edges of the panel and stitch lines 72 in the vicinity of the cutout portion 62.

Figures 4A, 4C:
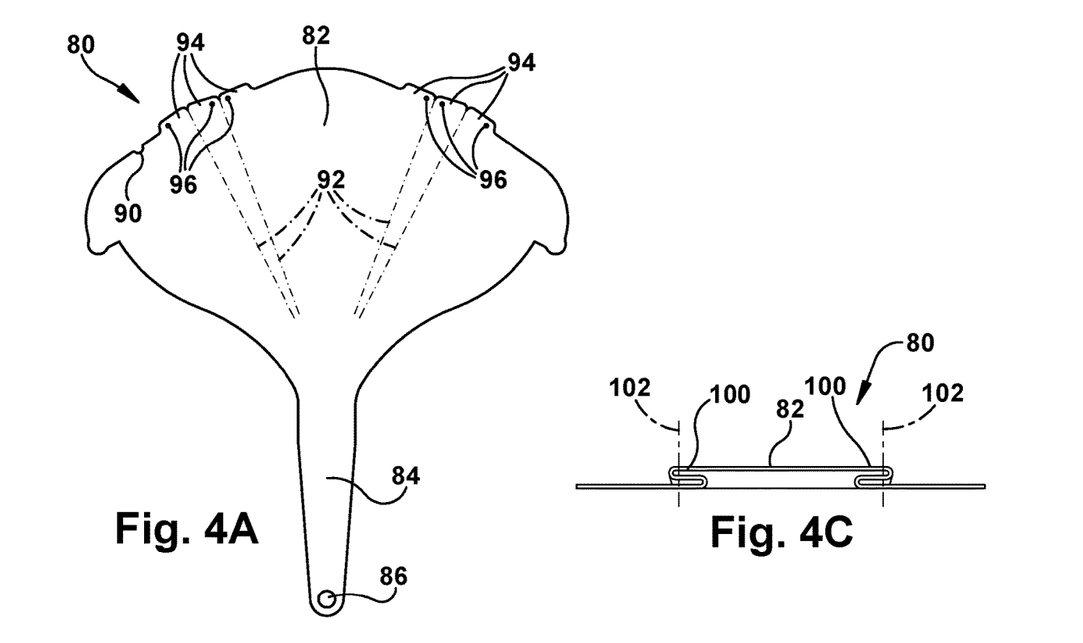
FIGS. 4A-4C are schematic illustrations of a vent flap portion of the vent in different conditions.

FIG. 4A illustrates a vent flap 80 component of the airbag vent 50. The vent flap 80 includes a flap portion 82 and a tether or tether portion 84. The flap portion 82 has an overall shape that is similar to the shape of the vent opening 52 (see, FIG. 2). The flap portion 82 is sized so as to be larger than the vent opening 52, providing a peripheral overlap with the airbag panel material surrounding the opening. The tether portion 84 has an end portion with an anchor opening 86 at its end for facilitating an anchored connection of the tether. The length of the tether 84 shown in the figures is by way of example only. The length of the tether 84 can be configured to match the geometry and special configuration of the vent and airbag components for the particular vehicle in which an airbag 14 including the vent 50 is installed.

Figures 4B, 4D:
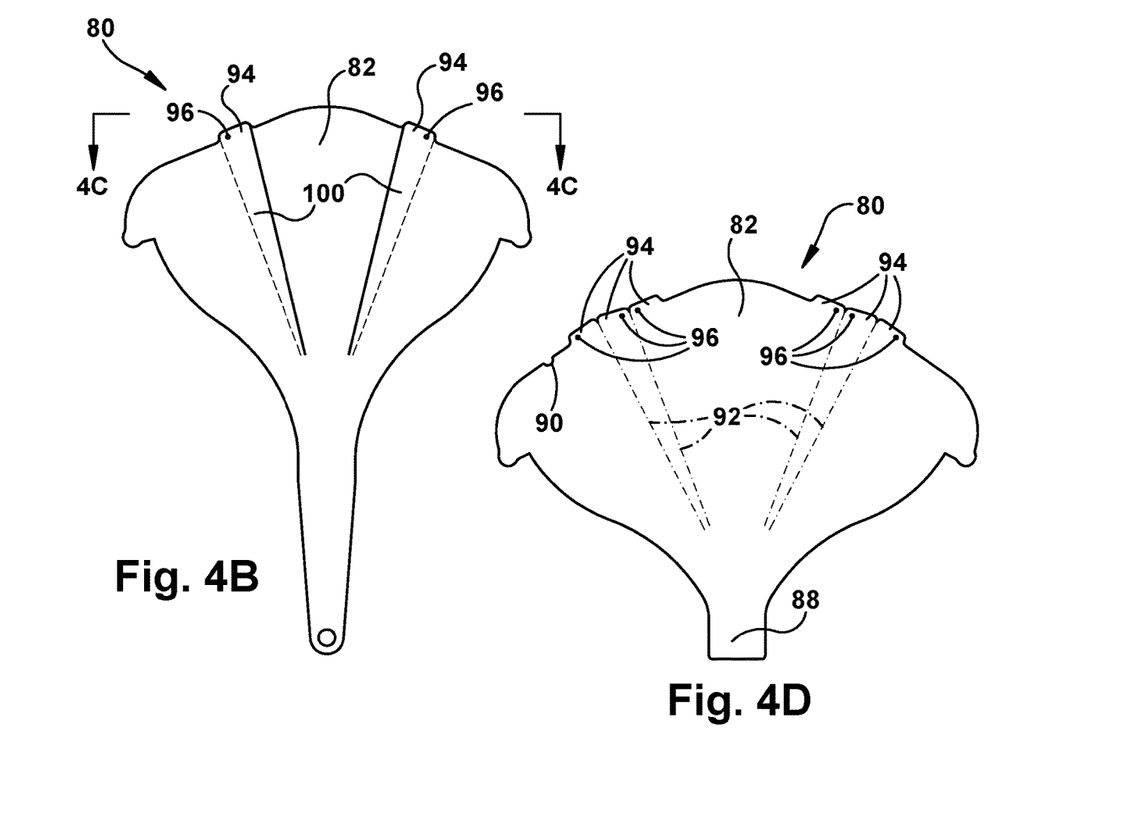
FIG. 4D is a schematic illustration of an alternative construction of the vent flap portion of the vent.

In another configuration, shown in FIG. 4D, the vent flap 80 can be configured so that the tab portion is a tether tab 88 to which a separate tether (not shown) can be attached. In this manner, the length of the tether can be selected by the length of the separate tether instead of through the configuration of the vent flap 80 itself. Thus, in this configuration, the flap portion 82 can be similar or identical to the flap portion of the vent flap shown in FIG. 4A, and the tab 88 with the separate tether attached, can serve as the tether portion 84. The only material difference in the configurations of the vent flaps of FIGS. 4A and 4D is that the vent flap of FIG. 4A is formed from a single sheet of fabric, whereas the flap of FIG. 4D is configured for the attachment of a separate length of tether material.

The flap portion 82 can also include features for assisting in assembly of the airbag vent 50. For example, the flap portion 82 can include one or more alignment notches 90 for assisting in the alignment of the panel during assembly of the vent 50. The flap portion 82 can also include indicia for facilitating folding and other manipulation of the flap portion performed during assembly of the vent 50. For example, the flap portion 82 can include fold lines 92 and alignment tabs 94 with alignment openings 96 to facilitate folding the flap portion during assembly of the vent 50.

Referring to FIGS. 4A-4C, to prepare the vent flap 80 for assembly, the flap portion 82 is folded along the fold lines 92 to form pleats 100 in the vent flap. While folding the flap portion 82 along the fold lines 92, the alignment tabs 94 and alignment openings 96 can be positioned overlying each other. The alignment of the alignment openings 96 is indicated generally by the dashed lines labeled 102 in FIG. 4C.

The flap portion 82 is configured to follow the general form of the vent opening 52 when folded to the pleated condition of FIG. 4C. In the pleated condition, the flap portion 82 presents the generally rounded diamond shape configuration of the vent opening 52. In the folded/pleated condition, the flap portion 82 is sized larger than the vent opening 52 so as to overlap the airbag material surrounding the opening, which allows the flap portion to form a sealing with the airbag 14 so as to block inflation fluid flow through the vent opening in the closed condition of the vent 50.

Figure 5A:
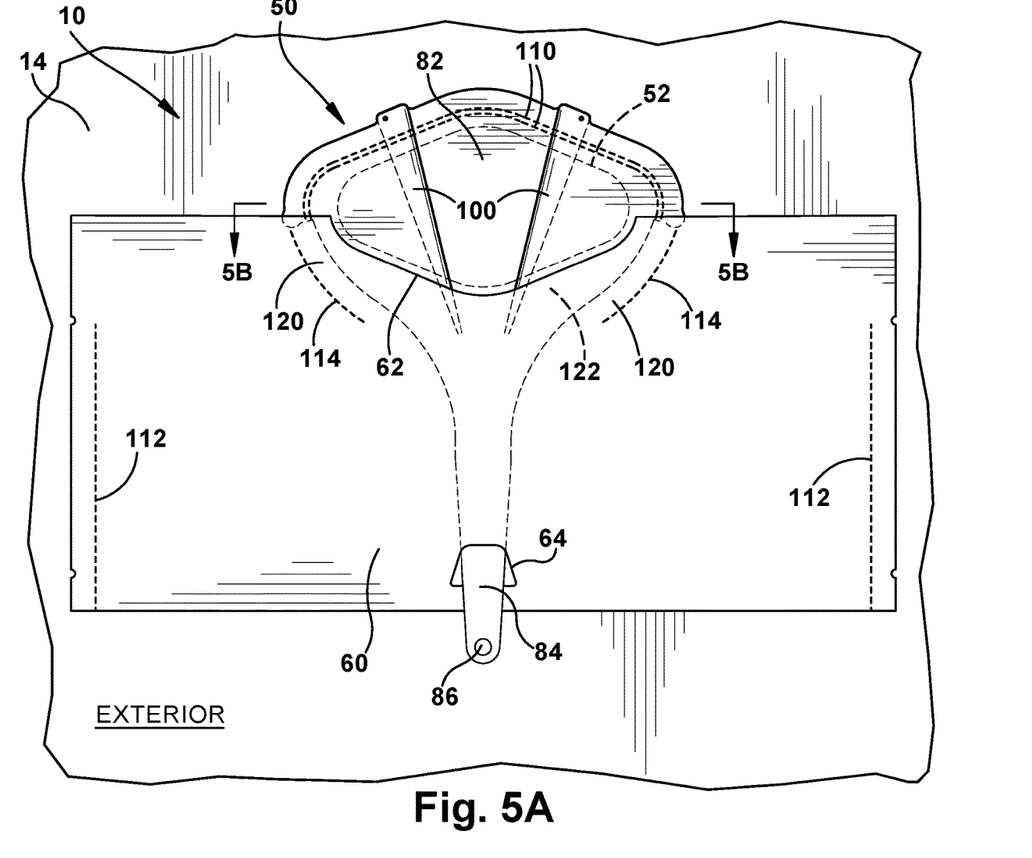
FIG. 5A is a schematic view from the interior of the airbag illustrating the assembly of the vent.
Figure 5B:
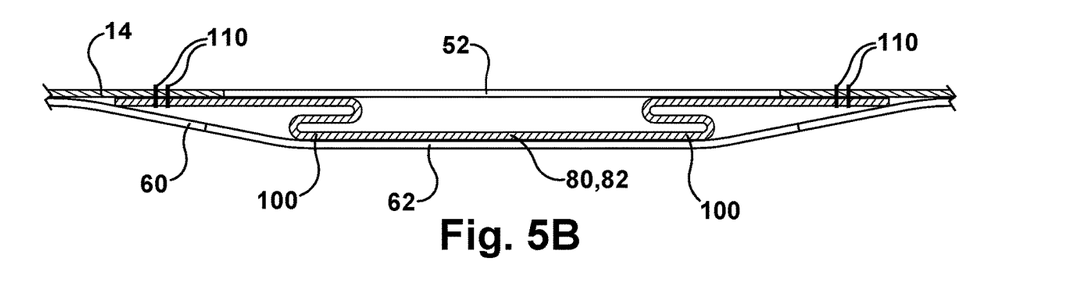
FIG. 5B is a sectional view taken generally along line 5B-5B in FIG. 5A, illustrating the assembly of the vent.

FIGS. 5A-5B illustrate the assembled condition of the vent 50. In discussing the vent 50 and the components and portions thereof, reference is made to portions of the components, such as a top portion/upper portion, a bottom portion/lower portion, a left portion/left end portion, and a right portion/right end portion. Reference to top, bottom, upper, lower, left, and right are made with reference to the airbag 14 and vent 50 as viewed in FIG. 5A.

Referring to FIGS. 5A-5B, to assemble the vent 50, the vent flap 80 is positioned on an exterior of the airbag 14 with the pleated flap portion 82 covering the vent opening 52. The pleated flap portion 82 is secured to the airbag 14 via connections, e.g., stitching, that extends along stitch lines 110. The stitch lines 110 secure the vent flap 80 to the airbag 14 and also maintain the pleats 100 in the flap portion 82.

The support panel 60 is positioned over the vent flap 80 on the exterior of the airbag 14 with the cutout portion 62 extending along the corresponding lower portion of the vent opening 52. Connections, e.g., stitch lines 112, connect the lateral left and right edges of the support panel 60 to the airbag 14. Connections, e.g., stitch lines 114, connect the support panel 60 to the airbag 14 in the area near the bottom or lower portion of the vent opening 52, adjacent the cutout portion 62 of the support panel.

As shown in FIG. 5A, the stitch lines 110 securing the pleated flap portion 82 to the airbag 14 extends along the top portion of the flap portion and the airbag material extending along the upper periphery of the vent opening 52. The stitch lines 110 extend to and partially around left and right end portions of the flap portion 82 and the underlying airbag material extending along the left and right ends of the vent opening 52. In this manner, the flap portion is connected to the airbag 14 and forms a permanent seal with the airbag that extends along the upper portion of the vent opening 52 and at least partially around left and right end portions of the vent opening. The lower portion of the flap portion 82 is left unconnected to the airbag 14.

As shown in FIG. 5A, the stitch lines 114 are spaced from the flap portion 82 of the vent flap 80 and follow the general contour of the flap portion, thus forming a pocket 120 between the support panel 60 and the exterior surface of the airbag 14. The pocket 120 receives and envelopes the lower portion 122 of the flap portion. The tether portion 84 of the vent flap 80 extends between the support panel 60 and the airbag 14, and exits through the tether opening 64 on the exterior of the airbag.

Figure 6A:
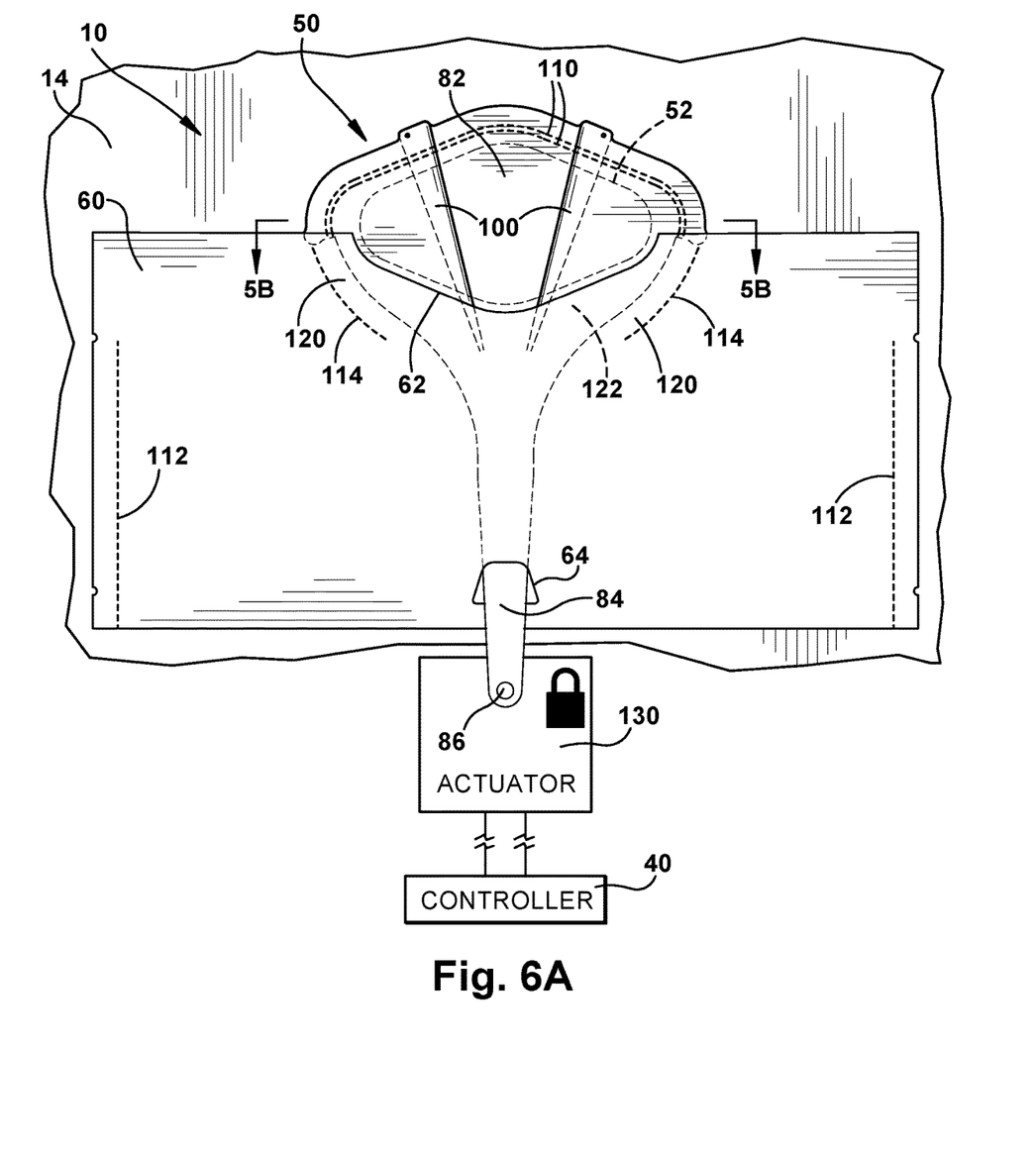
FIG. 6A is a schematic view from the exterior of the airbag illustrating the apparatus in an unactuated condition blocking inflation fluid venting from the airbag.

FIG. 6A illustrates the airbag vent 50 in a closed condition. Referring to FIG. 6A, as viewed from an exterior of the airbag 14, the apparatus 10 includes an actuator 130 to which the tether portion 84 of the vent flap 80 is connected. The actuator 130 anchors the tether portion 84 to the vehicle 12 to maintain the vent in a closed condition. The actuator 130 is actuatable to release the tether in response to a command from the airbag controller 40 to allow the vent to move to an opened condition, shown in FIG. 6B. The actuator 130 can be any actuatable device suited for releasing the tether portion 84 on command. The actuator 130 can, for example, be a pyrotechnic fastener (e.g., a "pyro bolt") or a solenoid actuated tether release mechanism.

In the closed condition of the vent 50 illustrated in FIG. 6A, the vent flap 80 is maintained in the illustrated closed condition due to the tether portion 84 being anchored via the actuator 130. The airbag 14 and vent 50 are configured so that the anchoring of the tether portion 84 results in a tensioning of the flap portion 82 across the vent opening 52 when the airbag is inflated and deployed. The stitching 110 anchors the flap portion 82 at one end of the vent flap 80, and the actuator 130 anchors the tether portion 84 at the other end of the vent flap. Because the flap portion 82 is sized to be larger than the vent opening 52, the tensioned flap 80 covers the vent opening and blocks the venting of inflation fluid from the airbag 14. The upper portion of the flap portion 82, being stitched to the airbag 14 via the stitching 110, prevents leakage between the upper portion and the airbag.

The stitching 110 securing the flap portion 82 to the airbag along the entire upper edge of the vent opening 52 and also around the opposite ends of the vent opening facilitates a tight sealing of the vent opening when the tether portion 84 is anchored by the tether. This is because the tension applied to the tether portion 84 in response to airbag inflation is exerted along the edges of the flap portion 80 from the anchor point to the ends of the stitching 110. The tensioned vent flap 80 therefore extends across and covers the entirety of the vent opening 52.

The support panel 60, particularly the pocket 120, receives the lower portion of the flap portion 82. In the closed condition of the vent 50, the lower portion of the flap portion 82 is tensioned into the pocket 120 by the tether portion 84. This allows the tensioned vent flap 80 to maintain the vent 50 in the closed condition and to withstand pressurization of the airbag 14 due to both inflation of the airbag and impacts with the airbag. Because the pocket 120 envelopes the flap portion 82 and the stitch lines 114 are spaced close to and follow the contour of the flap portion, the support panel 60 restricts the ability of the flap portion to move away from the vent hole 52 when tensioned by the tether portion 84. The pocket 120, formed to have the contour of the flap portion 82, helps maintain the shape of the vent flap 80 when the vent 50 is in the closed condition, which allows the vent flap to block inflation fluid flow through the vent opening 52.

From this, it is clear that configuring the stitching 110 to extend across widthwise across the flap portion 82 allows the flap portion to be tensioned along its lateral edges and lower portion across the entire vent opening 52. Tensioning the lower portion of the flap portion 82 into the pocket 120 allows the support panel 60 to provide additional reinforcement against the lower portion moving away from the air bag 14 and vent opening 52 when tension is applied to the vent flap 80 via the tether portion 84. Forming the pocket 120 to follow the configuration and contour of both the flap portion 82 and the vent opening 52 helps enforce and maintain proper positioning of the flap portion in the closed condition of the vent 50.

Figure 6B:
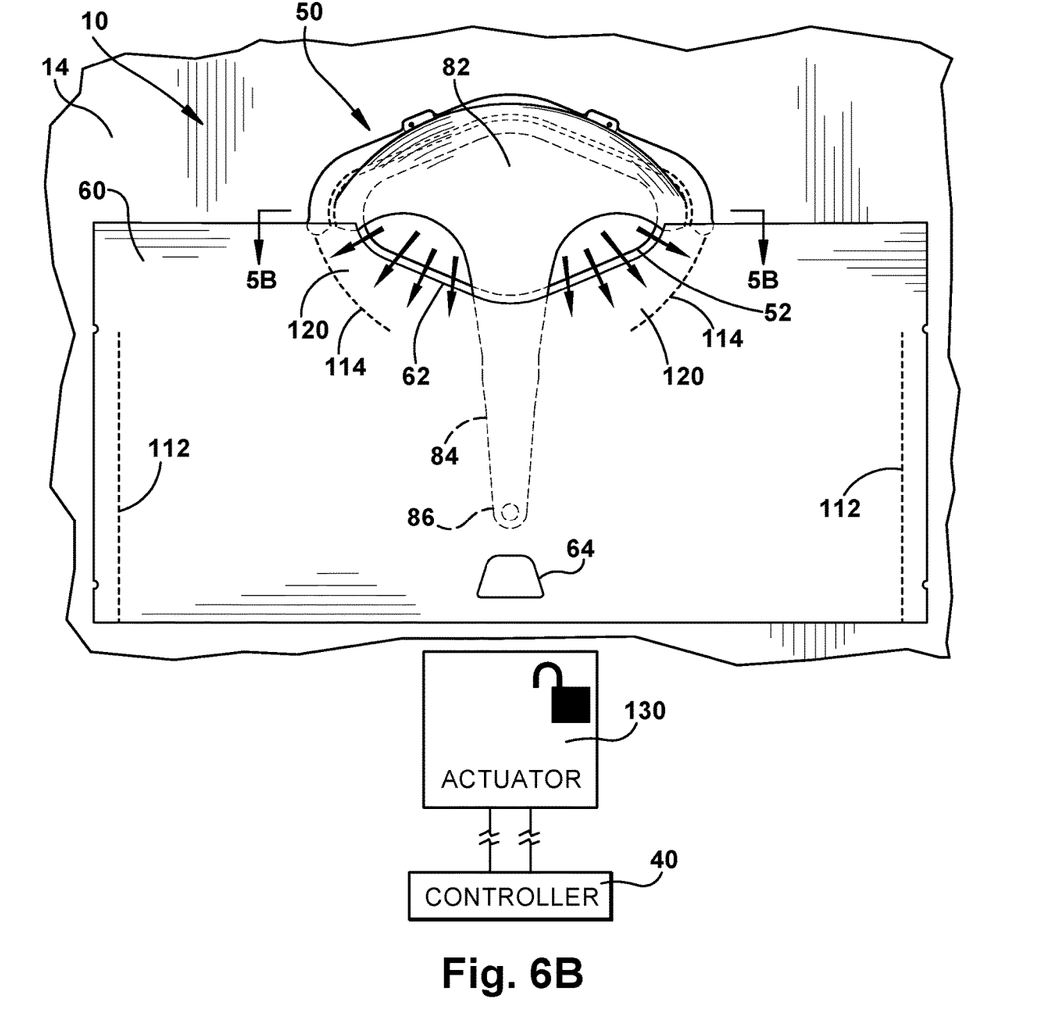
FIG. 6B is a schematic view from the exterior of the airbag illustrating the apparatus in an actuated condition venting inflation fluid from the airbag.

In the opened condition of the vent 50 illustrated in FIG. 6B, the actuator 130 releases the tether portion 84 in response to a command issued by the controller 40. When the airbag 14 is inflated and deployed, due to the actuator 130 releasing the tether portion 84, inflation fluid pressure inside the airbag urges the flap portion 82 to move out of the pocket 120 and away from the airbag, thus uncovering the vent opening 52. As the flap portion 82 moves away from the vent opening 52, the pleats 100 unfold, which expands the width/size of the flap portion 82 and furthers the extent to which the flap portion can move away from the airbag 14 and vent opening 52. As a result, and the unfolded flap portion 82 creates a vent outlet 140 comprising one or more openings through which inflation fluid can vent to the atmosphere on the exterior of the airbag, as indicated generally by arrows extending from the outlet.

Advantageously, the pleated configuration of the vent flap 80 allows for a single panel flap construction that 1) allows for an effective blocking and sealing of the vent 50 in the closed condition and 2) opens the vent sufficiently to permit a volumetric flow rate through the vent in the opened condition.

When the tether portion 84 is released, the pleats 100 unfold, which increases the width of the flap portion, as measured widthwise across the vent opening 52. The increase in width of the flap portion 82 increases the resulting size of the vent opening, which is defined by the flap portion. The flap portion 82 is pushed away from the airbag 14 due to internal inflation fluid pressure. Because the ends of the flap portion 82 necessarily are connected to the airbag 14 at opposite ends widthwise of the vent opening, the size of the vent outlet 140 through which inflation fluid can vent is limited by flap portion 82. Configuring the flap portion 82 with pleats 100 that unfold in the opened condition of the vent 50 increases the size of the effective opening through which inflation fluid vents, thus ensuring that the volumetric flow rate through the vent outlet 140 is sufficient to provide the desired degree of venting.

Additionally, the configuration of the vent opening 52, support panel 60, and vent flap 80 are configured to provide effective sealing in the closed condition of the vent 50 while, at the same time, providing an effective flow opening in the open condition of the vent. This is because the flap portion 82 is configured, when pleated, to follow the configuration and contour of the vent opening 52, and because the cutout portion 62 of the support panel 60 is configured to form a pocket 120 that also follows the configuration and contour of both the vent opening 52 and the flap portion. When the flap portion 82 is tensioned into the pocket 120, the vent 50 is effectively sealed in the closed condition, despite the relatively small overlap of the flap portion with the airbag material along the periphery of the vent opening. Because this overlap is relatively small, a correspondingly small amount of movement on the part of the flap portion 82 is required to open the vent 50. This, coupled with the fact that the size of the flap portion 82 increases due to unfolding of the pleats 100 in the opened condition of the vent 50, results in a vent outlet 140 having sufficient size to produce the desired flow rate through the vent 50.

From the above description of the invention, those skilled in the art will perceive improvements, changes and modifications. These improvements, changes and modifications within the skill of the art are intended to be covered by the appended claims.

Having described the invention, the following is claimed:

1. An apparatus for helping to protect an occupant of a vehicle, comprising:
   an airbag comprising a vent having a closed condition blocking inflation fluid flow through the vent, and an opened condition permitting inflation fluid to flow through the vent, the vent comprising:
   a vent opening formed in a panel of the airbag; and
   a vent flap connected to the airbag panel adjacent to the vent opening via a first connection that extends along an upper periphery of the vent opening, the vent flap being free from connections to the airbag panel along a lower periphery of the vent opening, the vent flap being configured to block inflation fluid flow through the vent opening in the closed condition of the vent, and to permit inflation fluid flow through the vent opening in the opened condition of the vent;

wherein the vent flap comprises a plurality of folds configured to form one or more pleats in the vent flap, the vent flap being configured to be held extending across the vent opening, overlying the lower periphery of the vent opening, and covering the vent opening in the closed condition of the vent, the vent flap being configured to be released and uncovering the vent opening in the open condition of the vent, and
   wherein, in response to the vent flap being released in the open condition of the vent, the vent flap is configured to uncover the vent opening and the pleats are configured to unfold under the pressure of inflation fluid in the airbag to permit inflation fluid to vent through the vent opening.

2. The apparatus recited in claim 1, wherein the vent flap is configured to be tensioned in the closed condition of the vent.

3. The apparatus recited in claim 1, wherein the vent further comprises a vent outlet defined by the vent opening and the vent flap, wherein the vent outlet is blocked in the closed condition of the vent, and unblocked in the opened condition of the vent, and wherein the pleats in the vent flap are configured to unfold when the vent is in the opened condition of the vent to enlarge the size of the vent outlet in the open condition of the vent.

4. The apparatus recited in claim 1, wherein the vent flap comprises a flap portion and a tether portion, wherein the tether portion is configured to apply tension to the flap portion, and wherein the flap portion includes the pleats and is configured to block inflation fluid flow through the vent opening in the closed condition of the vent, and to permit inflation fluid flow through the vent opening in the opened condition of the vent.

5. The apparatus recited in claim 4, further comprising a support panel connected to the airbag and configured to support the vent flap, the support panel forming a pocket between the support panel and the airbag, the pocket receiving the flap portion and maintaining the flap portion positioned to block inflation fluid flow through the vent opening in the closed condition of the vent.

6. The apparatus recited in claim 5, wherein the first connection connects an upper edge portion and opposite end portions of the flap portion to the airbag along the upper periphery of the vent opening, wherein a lower portion of the flap portion is received in the pocket.

7. The apparatus recited in claim 6, wherein the first connection comprises stitching that extends along a periphery of the flap portion from a first end portion of the flap portion, along the upper edge portion of the flap portion, to a second end portion of the flap portion.

8. The apparatus recited in claim 6, wherein the pleats extend through the upper edge portion of the flap portion, and wherein the first connection maintains the pleated configuration of the flap portion in the area of the first connection.

9. The apparatus recited in claim 6, wherein the first connection extends along the upper periphery of the vent opening from a first end of the vent opening, along an upper edge of the vent opening, to a second end, opposite the first end, of the vent opening, and wherein, in the opened condition of the vent, a vent outlet is defined by a lower peripheral edge of the airbag adjacent the vent opening and a lower edge portion of the flap portion.

10. The apparatus recited in claim 5, wherein the vent opening has a predetermined shape, and wherein the flap portion is configured to approximate the predetermined shape when the pleats are folded, the flap portion being further configured to be sized larger than the vent opening so as to overlap with airbag material along an entire periphery of the vent opening when the vent is in the closed condition.

11. The apparatus recited in claim 10, further comprising a first connection that connects the flap portion to the airbag along an upper periphery of the vent opening.

12. The apparatus recited in claim 5, wherein the vent flap and the support panel are secured to an exterior of the airbag with a lower portion of the flap portion and the tether portion being positioned between the airbag and the support panel.

13. The apparatus recited in claim 5, further comprising support panel connections that connect the support panel to the airbag panel, wherein the support panel connections follow the contour of the lower periphery of the vent opening, are spaced from the vent opening, and help define a portion of the pocket that receives the lower portion of the flap portion.

14. The apparatus recited in claim 13, wherein the tether portion of the vent flap is configured to extend between the support panel connections and to exit the pocket through an opening in the support panel.

15. The apparatus recited in claim 4, wherein the vent flap consists of a single piece of fabric material that is cut out or otherwise constructed to include the flap portion and the tether portion, and wherein in the closed condition of the vent, the vent flap is configured as a single pleated layer of material that covers the entire vent opening.

16. The apparatus recited in claim 1, further comprising an actuator connected with the vent flap, wherein the actuator anchors the vent flap so that the vent is maintained in the closed condition, the actuator being actuatable to release the vent flap to place the vent in the opened condition.

17. The apparatus recited in claim 16, wherein the airbag, vent flap, and actuator are configured so that the vent flap is tensioned in response to deployment of the airbag while the actuator anchors the vent flap.

18. The apparatus recited in claim 17, further comprising a support panel connected to the airbag and configured to support the vent flap, the support panel forming a pocket for receiving the flap portion, wherein the airbag, vent flap, and actuator are configured so that the flap portion is tensioned into the pocket in the closed condition of the vent.

19. An airbag module comprising:
the apparatus recited in claim 1,
an inflator for inflating the airbag; and
a housing for supporting the inflator and the airbag in a deflated and stored condition.

20. A vehicle safety system comprising:
the airbag module recited in claim 19;
an actuator for maintaining the vent in the closed condition, the actuator being actuatable to place the vent in the opened condition;
at least one crash sensor;
at least one vehicle and/or occupant condition sensor; and
a controller configured to control the actuation of the inflator in response to the at least one crash sensor, and to control the actuator in response to the at least one vehicle and/or occupant condition sensor.

* * * * *